United States Patent [19]

Rester

[11] 4,423,137

[45] Dec. 27, 1983

[54] CONTACT PRINTING AND ETCHING METHOD OF MAKING HIGH DENSITY RECORDING MEDIUM

[75] Inventor: Marshall D. Rester, Anaheim, Calif.

[73] Assignee: Quixote Corporation, Chicago, Ill.

[21] Appl. No.: 289,064

[22] Filed: Jul. 31, 1981

Related U.S. Application Data

[63] Continuation-in-part of Ser. No. 201,554, Oct. 28, 1980, abandoned, which is a continuation-in-part of Ser. No. 64,177, Aug. 6, 1979, abandoned, which is a continuation-in-part of Ser. No. 43,429, May 29, 1979, abandoned.

[51] Int. Cl.³ .................. G03C 5/00; G01D 15/14; G11B 7/02; H04N 5/76
[52] U.S. Cl. ................................. 430/320; 346/1.1; 346/76 R; 346/76 L; 346/135.1; 346/137; 430/5; 430/313; 430/315; 430/318; 430/321; 430/323; 430/325; 430/326; 430/329; 430/330; 358/342; 358/345; 369/285
[58] Field of Search ............... 430/321, 320, 315, 323, 430/329, 330, 5, 326, 325, 168, 318, 313; 346/76 L, 76 R, 135.1, 137, 1.1; 358/128.5

[56] References Cited

U.S. PATENT DOCUMENTS

| | | | |
|---|---|---|---|
| 3,379,095 | 4/1968 | Kaprelian | |
| 3,751,285 | 8/1973 | Ruckert et al. | 430/168 |
| 3,894,179 | 7/1975 | Jacobs et al. | 430/321 |
| 3,905,817 | 9/1975 | Bakewell | |
| 3,942,981 | 3/1976 | Sato | |
| 3,954,469 | 5/1976 | Avanzado et al. | |
| 4,061,829 | 12/1977 | Taylor | 430/325 |
| 4,063,949 | 12/1977 | Uhlig et al. | |
| 4,109,045 | 8/1978 | Goshima et al. | 346/135.1 |
| 4,164,754 | 8/1979 | Dubois | |
| 4,174,219 | 11/1979 | Andres et al. | |
| 4,252,889 | 2/1981 | Tinet et al. | 430/321 |
| 4,258,126 | 3/1981 | Hiesinger | 430/321 |
| 4,259,433 | 3/1981 | Mizobuchi et al. | 430/323 |
| 4,281,057 | 7/1981 | Castellani et al. | 430/323 |
| 4,292,388 | 9/1981 | Ikeda et al. | 430/323 |
| 4,292,395 | 9/1981 | Wada et al. | 430/323 |
| 4,307,172 | 12/1981 | Ishihara et al. | 430/323 |
| 4,321,317 | 3/1982 | MacIver | 430/323 |
| 4,352,870 | 10/1982 | Howard et al. | 430/326 |

OTHER PUBLICATIONS

DeForest, W. S., "Photoresist Materials and Processes", McGraw-Hill Book Co., 1975, pp. 132-136, 143-149.
One Micron Range Photoresist Imaging: A Practical Approach by David J. Elliott, et al., vol. 22, No. 6, Jun., 1979 issue of Solid State Technology.
Photoresist Technical Manual (Shipley Company).
AZ-1300 Series Positive Photo Resists for Microelectronics (Shipley Co. Doc. PR-004).
AZ-1300 Series Microfiltered Positive Photo Resists (Shipley Co. Doc. MF-1300).
AZ-1400 Series Striation-Free Positive Photo Resists for Microelectronics (Shipley Co. Doc. D-1400B).

*Primary Examiner*—Charles L. Bowers, Jr.
*Attorney, Agent, or Firm*—Willian, Brinks, Olds, Hofer, Gilson & Lione Ltd.

[57] ABSTRACT

A process for making a radiation-reflecting record carrier, such as a video disc, is provided on which video and/or audio information is stored in an optically readable track in which reflective areas alternate with non-reflective areas, the two areas having different effects on a reading beam in a playback machine so that the information recorded on the carrier may be recovered. The non-reflective areas are formed as apertures in the reflective areas and the underlying substrate is preferably translucent. The disclosed process uses photographic techniques to form a master negative or positive, and to form record carrier replicas from the master.

In one disclosed embodiment of the method and apparatus of this invention, a two-sided recording medium comprises two transparent substrates, each of which supports a perforated metallic, reflecting layer. The two substrates are held together by a layer of adhesive disposed between the two reflecting layers.

15 Claims, 8 Drawing Figures

VIDEO DISC MASTERING

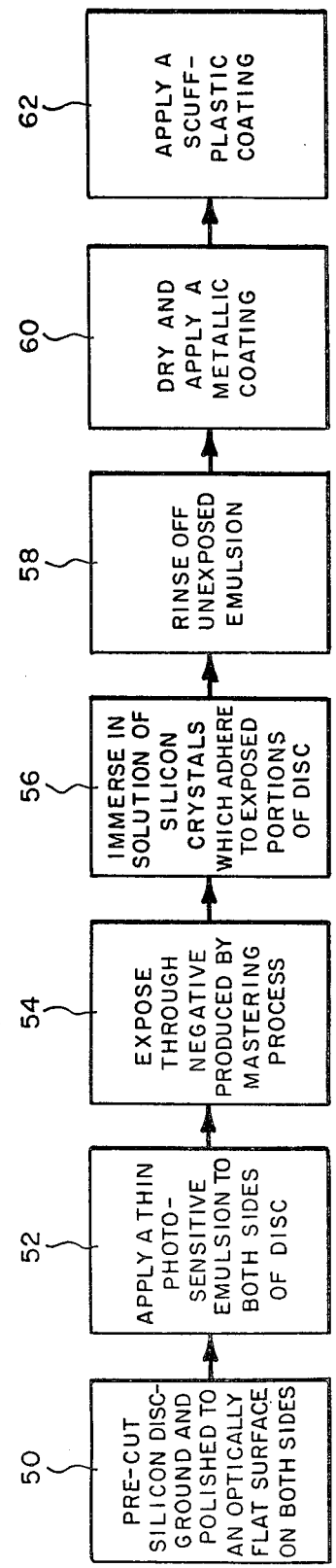

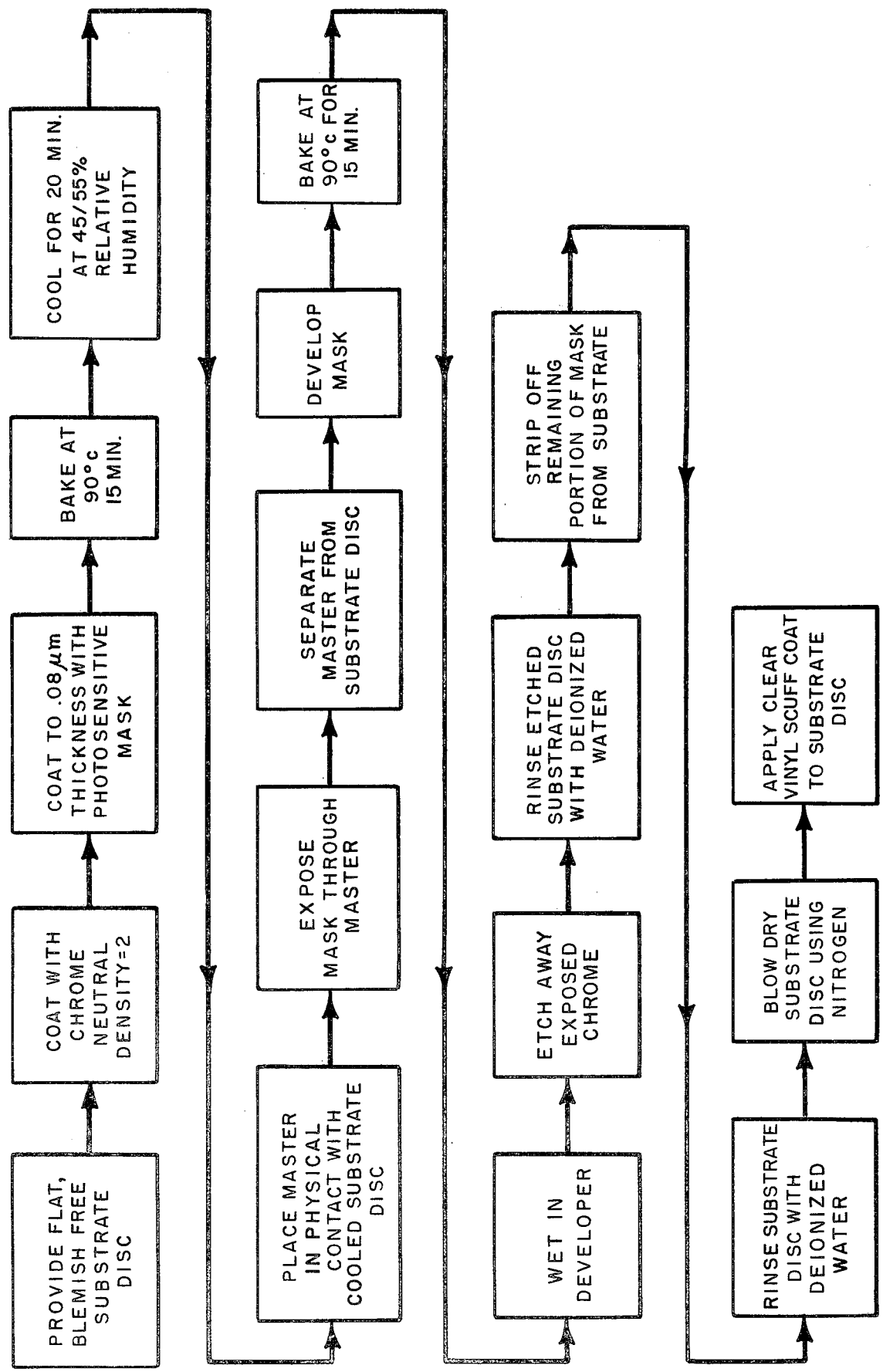

CONTACT PRINTING AND ETCHING METHOD OF MAKING HIGH DENSITY RECORDING MEDIUM

BACKGROUND OF THE INVENTION

This application is a continuation-in-part of co-pending application Ser. No. 201,554, filed Oct. 28, 1980, which is a continuation-in-part of co-pending application Ser. No. 64,177, filed Aug. 6, 1979, which, in turn, is a continuation-in-part of co-pending application Ser. No. 43,429, filed May 29, 1979, all now abandoned.

The usual video disc type of radiation-reflecting record carrier is composed of a continuous spiral track which extends from the center of the disc towards its outer peripheral edge. The track on the video disc is analagous to the spiral groove on the usual audio record, but in reverse.

One type of commercially marketed prior art video disc includes a multiplicity of microscopic pits in the form of minute identations spaced along the spiral track. The prior art video disc is coated with light reflective material, and it is read by directing a reading light beam at the surface of the disc to be reflected thereby. The depth of the pits in the prior art video disc is precisely related to the wavelength of the light of the reading beam so that the light reflected from inside a pit will have a cancellation effect on the light in the beam. This causes the light reflected by the pits to be less bright than the light reflected by the areas between the pits. In this manner, the reading light beam is intensity modulated as the video disc rotates. The modulated beam is then detected in known electronic circuitry and transformed into corresponding electrical signals which may be reproduced in a conventional television receiver.

In the production of these prior art video discs it is usual first to produce a master disc which takes the form of a plate glass disc coated with photo-resist, the surface of which is exposed by a modulated laser beam to produce the recordings described above. The recording surface of the master disc is then developed and metallized with an evaporated metal coating. A stamper is then produced which is a mirror image of the master disc, and replicas are formed from the stamper in large quantities in a special stamping or injection molding apparatus. A metal reflective layer is then applied to the surface of each replica, and a plastic scuff coating is applied over the reflective layer to form one side of the video disc. This side of the video disc is bonded to another side, formed in the same manner, to provide a complete video disc which has recorded video and audio information on each side.

In a typical prior art video disc of the type described above, the depth of each pit is of the order of 0.11 microns, and this dimension must be precisely maintained if the pit is to perform its function of modulating the intensity of the reading light beam. Because of the excessively close tolerance required in the depth of the pit, the useful life of the stamper is short and the rejection rate of replicas is high. Accordingly, these prior art video discs are expensive to produce and are high in cost.

A second prior art approach to the manufacture of video discs relies on photographic techniques to form light reflective data spots on a disc record. U.S. Pat. No. 4,090,031, for example, suggests that such spots may be formed by etching through a photoresist mask, although no details are given as to how this is to be accomplished in the mass production of replica discs. U.S. Pat. No. 3,381,085 discloses techniques for transferring data from a master disc to a copy disc or to a working master disc by photographic means. However, the data are recorded on the master disc in the latter patent in the form of a variable track of information having variable light transmissive characteristics, which is significantly different from the method of the present invention, as will become more apparent as the description proceeds. Moreover, U.S. Pat. No. 3,795,902 suggests generally that playback records may be made by chemical etching such as by using photoresist techniques, although, again, no details are given.

SUMMARY OF THE INVENTION

The video disc of the present invention provides a recording medium which does not rely on microscopic pits. Instead, the video disc of the invention includes apertures, which replace the pits, and which serve to direct the reading beam away from the path along which the beam is reflected by the areas between the apertures. In this manner, the required intensity modulation of the reflected reading beam is achieved without the need for pits of a microscopically precise depth in order to achieve the modulation effect, as is the case with some prior art discs. Also, the replica discs of the present invention are produced by photo-optical techniques from a master negative or positive, which permits high precision continuous processing with a minimum of rejects as compared with the prior art stamping and injection molding processes for replica production.

According to a first aspect of this invention, a high density recording medium is provided which comprises a substrate having a translucent surface and a reflecting layer bonded to the surface. This reflecting layer defines an array of apertures formed therein, and these apertures have a minimum dimension of less than about 0.6 microns. Preferably, over 70% of the recording surface of the medium is covered by the reflecting layer. The reflecting layer and the apertures have differing optical characteristics, because a reading beam of optical radiation is reflected from the reflecting surface but passes through the apertures into the substrate. Throughout this application and the following claims the term "optical" is used in its broad sense to encompass ultraviolet, visible, and infra-red radiation.

According to a second aspect of the invention, a high density recording medium is fabricated by providing a substrate having a first surface covered by a reflecting layer, and then coating at least a portion of the reflecting layer with a masking layer of a radiation sensitive material having a thickness less than about 0.1 microns. A microscopic pattern is then exposed on the masking layer, such that a first patterned plurality of microscopic regions of the masking layer, each having a minimum dimension of less than about 0.6 microns, is exposed to a radiation to a different extent than a second region of the masking layer; and the first plurality of microscopic regions is selectively removed to expose a corresponding plurality of regions of the underlying reflecting layer. The exposed plurality of regions of the underlying reflecting layer are removed, and then the remaining portions of the masking layer are removed to expose the remaining portions of the reflecting layer.

These first and second aspects of the invention provide a number of important advantages. First, the medium of this invention is fabricated by means of optical and chemical methods, and therefore mechanical forming methods, such as stamping and molding operations, for example, can be eliminated entirely. By eliminating such mechanical forming methods, the manufacturing process is made independent of precise mechanical dimensions on stamping or molding equipment and therefore more reliable. Furthermore, masters and submasters used to produce the media of this invention are not subject to the wear and deterioration which is occasioned by stamping and molding operations.

Second, the recording medium of this invention is well adapted to avoid problems related to localized heating during the reading operation. Because over 70% of the recording surface is preferably covered with a reflecting layer, the majority of the incident reading radiation is reflected and therefore does not contribute to localized heating of the recording medium. Furthermore, because the apertures allow reading radiation to pass through the reflecting layer to be scattered and diffused through a relatively large volume of the translucent substrate, localized heating at the apertures is also avoided. In addition, the generally reflective nature of the recording medium of this invention ensures that a major fraction of a beam of incident radiation is reflected. This reflected radiation is available for detection and use by systems for automatically focusing and pointing the reading beam.

According to a third aspect of this invention, a two-sided, high density recording medium comprises first and second translucent substrates, each of which includes a respective reflecting layer bonded thereto. Each of the reflecting layers defines a respective array of apertures formed therein, and the apertures have a minimum dimension of less than about 0.6 microns. A layer of adhesive is bonded between the two reflecting layers to secure the first substrate to the second substrate.

This two-sided recording medium is read by directing a reading beam through one of the two substrates onto the respective reflective layer. The adhesive layer serves optically to isolate the two reflecting layers, as well as to secure the two substrates together as a unit. By bonding the two substrates together with the reflecting layers on the inside, the need for a separate scuff coating is eliminated. This is because the substrate itself serves to protect the reflecting layer from scratches or abrasion. Mylar or other thin, flexible films are suitable for use as substrates; and conveyor coating, exposure, developing, etching, and stripping techniques can be used with roll stock substrates to fabricate recording media efficiently with a large degree of automation.

The invention itself, together with further objects and attendant advantages, will best be understood by reference to the following detailed description taken in connection with the accompanying drawings.

BRIEF DESCRIPTION OF THE DRAWINGS

FIG. 4 is a block diagram of the various steps by means of which finished video replica discs may be produced in large quantities from the master produced by the process of FIG. 3.

FIG. 8 is a block diagram of the various steps of a second preferred embodiment of this invention for producing finished replica video discs.

DETAILED DESCRIPTION OF THE PRESENTLY PREFERRED EMBODIMENTS

Figure 1:
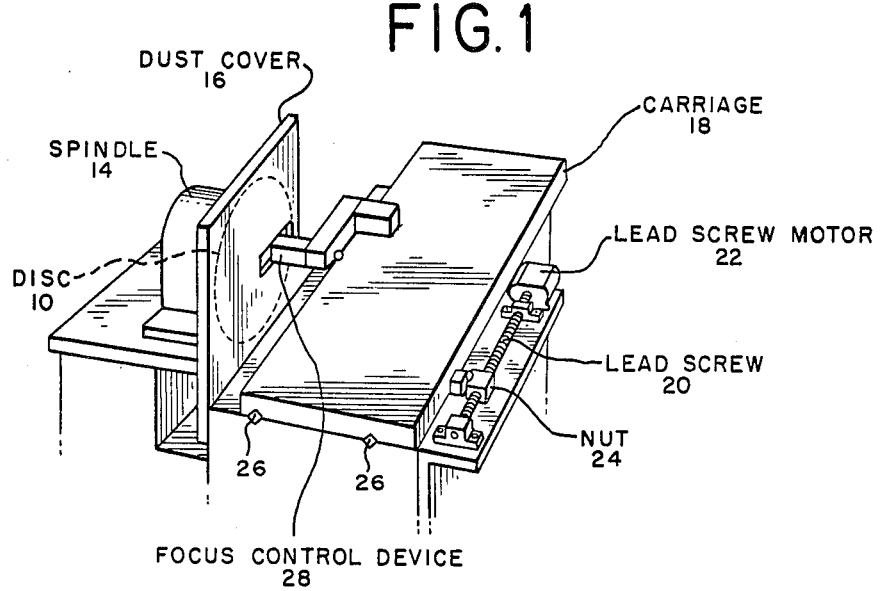
FIG. 1 is a schematic representation of apparatus by which a master disc may be formed in carrying out the concepts of the invention.
Figure 2:
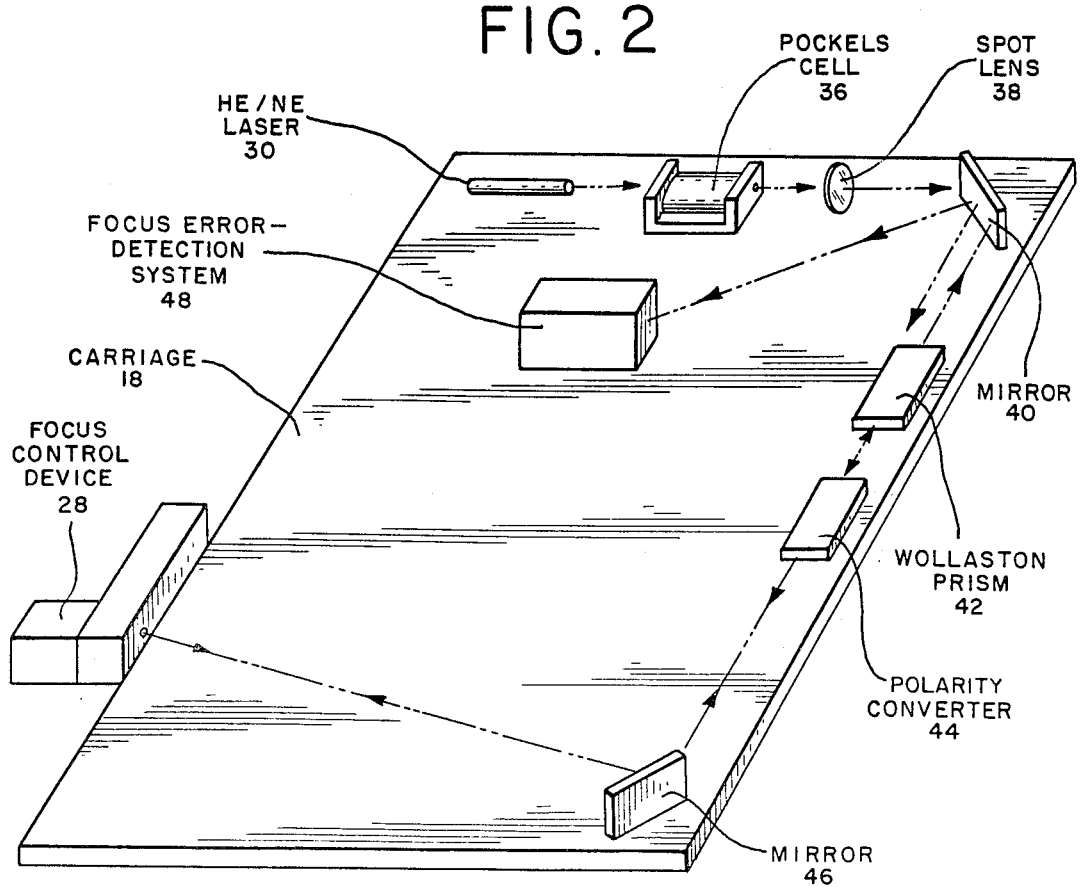
FIG. 2 is a detailed schematic representation of a movable carriage which is included in the apparatus of FIG. 1.
Figure 3:
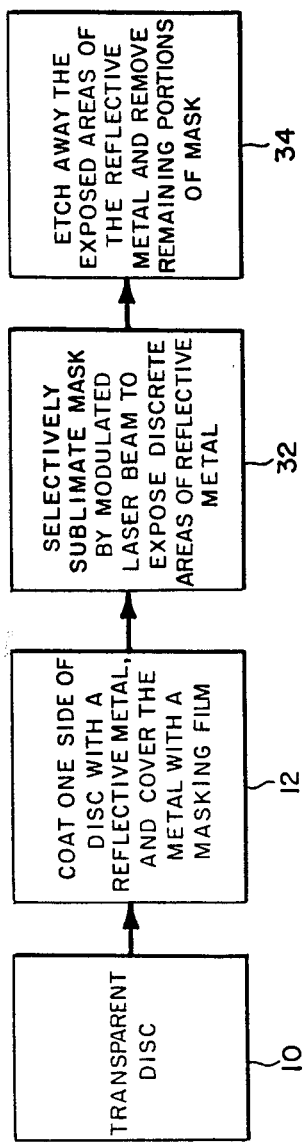
FIG. 3 is a block diagram showing the various steps of a mastering process by which a master video disc may be formed in carrying out the concepts of the invention.

Reference is now made to FIGS. 1, 2 and 3 for a description as to the manner in which a master disc is produced in carrying out the concepts of the present invention.

As represented by block 10 in FIG. 3, the video disc mastering process begins with the procurement of an optically flat transparent glass disc of, for example, twelve inches in diameter. The transparent glass disc is ground and re-ground with an extremely fine abrasive to remove all pits, and it is then optically polished and carefully cleaned. Then, as shown in block 31 of FIG. 3, the disc is coated on one side with a reflective metal, such as chrome, and the metal is then covered with a thin film mask, which may be formed of a photosensitive material, such as Shipley photo-resist No. 1350. The metal may be deposited on the disc by any suitable method, such as vapor deposition, sputtering, or the like.

The disc 10 is then mounted on a spindle 14 (FIG. 1) which is driven by an appropriate motor, so that the disc may be turned about the axis of the spindle at a speed, for example, of 1800 rpm. The disc is enclosed in an appropriate dust cover 16. A carriage 18 is mounted on an appropriate frame, and the carriage is driven along rails 26 by a lead screw 20 which, in turn, is rotated by a motor 22, and threads through a nut 24 attached to the carriage. Focus control device 28 is mounted on the carriage, and an objective lens (not shown) is included in the device.

During the operation of the apparatus of FIG. 1, a modulated laser beam, derived, for example, from a helium/neon laser 30 (FIG. 2) mounted on the carriage 18, is directed to the objective lens in device 28. As the carriage 18 is moved by lead screw 20, and as the disc 10 rotates, the modulated laser beam selectively sublimates the mask on the disc 10 to form holes in the mask in accordance with the modulations of the laser beam, as represented by block 32 in FIG. 3, so as to expose discrete layers of the underlying metal layer. The power of the laser 30 is preferably chosen to be sufficient to sublimate the mask without vaporizing or melting the underlying metal layer. The exposed areas of the chrome are then removed by an acid or plasma etch to reveal corresponding transparent glass areas. The remaining portions of the mask are removed to reveal discrete reflective areas of the chrome, as represented by block 34 in FIG. 3. The result is a master video disc with reflective areas and transparent areas.

As shown in FIG. 2, a number of components are mounted on the carriage 18, so that a modulated laser beam may be directed to the objective lens in device 28, to sublimate the mask on the disc 10 in accordance with the modulations of the beam. The beam from the helium/neon laser 30 is passed through a Pockels cell 36. The Pockels cell is formed of electro-optical material in which the indices of refraction are changed directly by an applied electric field. The Pockels cell, which is formed of solid electro-optical material, can be replaced by a Kerr cell, which is formed of a liquid electro-optical material.

The video and audio information are combined into a frequency modulated signal, and the signal is applied to the Pockels cell 36 to modulate the laser beam. The Pockels cell alternately, partially blocks and passes the laser beam, so that the beam is appropriately mmodulated by the video and audio information, this being achieved in a manner known to the art. Specifically, all information, including video signals, audio signals, synchronizing signals, special code signals, and the like, is frequency modulated on a selected carrier signal having a center frequency of approximately 8 megacycles, and the modulated carrier is applied to the Pockels cell 36 to modulate the laser beam from laser 30.

The modulated laser beam then passes through a spot lens 38, and it is reflected by a mirror 40 through a Wollaston prism 42. The laser beam from Wollston prism 42 is passed through a polarity inverter 44, and is reflected by a mirror 46 to the objective lens in the focus control device 28. In this manner, the focused modulated laser beam is directed to the disc 10, so that it may be moved effectively along a spiral track on the disc to sublimate the film on the disc in accordance with the modulations of the beam.

The mask on the disc 10 does not absorb 100% of the focused beam, and some portion is reflected back to mirror 46, and through polarity converter 44 to the Wollaston prism 42. The Wollaston prism is, in reality, two prisms of birefringent material, such as quartz or calcite, cemented together to make a plane-parallel plate in which the optic axes of the two component prisms are mutually perpendicular and are parallel to the parallel faces of the plate.

The vertically polarized beam from mirror 40 passes through a Wollaston prism and is unaffected thereby. However, the horizontally polarized beam reflected back to the Wollaston prism from the polarity converter 42 is displaced from the beam from mirror 40, and the displaced beam is reflected by mirror 40 to a focus error detection system 48. The focus error detection system 48 is a known electronic circuit which includes photosensitive diodes which convert the reflected beam into electric signals. The resulting electric signals are used in known manner to control the focus control device 28, so as to maintain the laser beam focused at a selected plane within the disc 10. Other types of focusing controls may be used. For example, the focus control system illustrated and described in U.S. Pat. No. 3,969,575 (*Gerritsen, et al.*) is appropriate.

The process described above is one wherein the original program from any video source is recorded in real time as a geometrical pattern on a transparent master video disc by sublimating areas of the masking film on the disc at a real time rate. The resulting master video disc has an essentially two-dimensional surface, as compared with some prior art masters which have a three-dimensional surface from which the respective prior art replicates are molded or stamped.

The master itself can be used directly to produce video disc replicas in accordance with the process of the invention. However, less expensive sub-master discs may be made from the master, and the sub-master discs may be used to produce the replicas.

To form the sub-master disc a transparent glass disc is coated with a reflective metal and covered with a mask, such as a photo-sensitive resist. Then, the master disc is placed over the sub-master disc, and the mask on the sub-master is exposed by ultra violet light which passes through the master. The mask is then developed, and the unexposed portions of the mask are washed away to reveal discrete areas of the reflective metal. The discrete areas of the reflective metal are then etched away and appropriate etching and stripping steps are followed to produce the sub-master disc. The master and sub-master discs may be coated with an appropriate anti-reflective material.

As mentioned above, the master disc is preferably used to provide a number of less expensive sub-master discs, and the resulting sub-master discs are used to produce the video disc replicas of the present invention by photographic techniques, rather than by the prior art stamping or molding process. The resulting video disc replicas are capable of use with the prior art playback machines which presently are being used to play back the video information recorded by the formation of pits in the prior art video discs, as described above. An appropriate machine for reading the information on the preferred embodiments of video disc replicas produced in accordance with the present invention is, for example, the Magnavox Model VH8000 video disc player.

A first method for making replicas by which the information recorded on the master negative is transferred photographically to each video disc replica, is represented by the block diagram of FIG. 4. This method is the subject of, and is claimed in, my parent application, Ser. No. 064,177.

As shown by block 50 in FIG. 4, the first step in the production of a replica in accordance with this process is to pre-cut, for example, a 12-inch silicon disc, which is then ground and polished to an optically flat surface on both sides. The surface impurities are reduced by the polishing action to less than 0.1 microns in height. In the next step, as represented by block 52 in FIG. 4, a thin coating (of the order of less than 0.5 microns) of photoresist is applied to both sides of the disc. Kodak Micro Resist 807 may be used for this purpose. The photoresist on the disc is then exposed (block 54) through the negative produced by the mastering process described above. The resist is developed, and the exposed areas of the resist are removed. The exposing and developing steps, per se, are known to the art. The disc is then immersed in a tank containing silicon in an aqueous solution (block 56), and silicon crystals adhere to the portions of the disc previously covered by the exposed areas of the resist to form lands. The aqueous solution contains water and silicon in a ratio of the order of 2:1 to 5:1 by weight. The temperature of the solution is of the order of 80° F.–90° F. The technique of growing silicon crystals on a silicon substrate per se is known. Such growth is described, for example, in McGraw Hill Encyclopedia of Science and Industry, Vol. 3, 1971 edition. The resulting crystal lands are then etched for about 1 second, in a solution of hydrofluoric acid at room temperature. This causes the lands to assume a triangular shape. The hydrofluoric acid solution may, for example, be 1 part hydrofluoric acid and 10 parts water by weight. The height of the triangular lands is of the order of 1 micron, this height being achieved after a growing time of approximately 1-5 seconds.

The unexposed resist is then rinsed off the disc in a usual stripping tank containing an appropriate organic chamical, in accordance with the next step (block 58), leaving an optically flat surface with a pattern of minute crystal lands representing the information contained in the original negative. The disc is then rinsed and air dried, and a metallic reflective coating is applied, for example, by an appropriate vacuum deposition process (block 60). Finally, and as shown in block 62, a scuff-plastic coating is applied, and the disc is ready for packaging and distribution.

Figure 5:
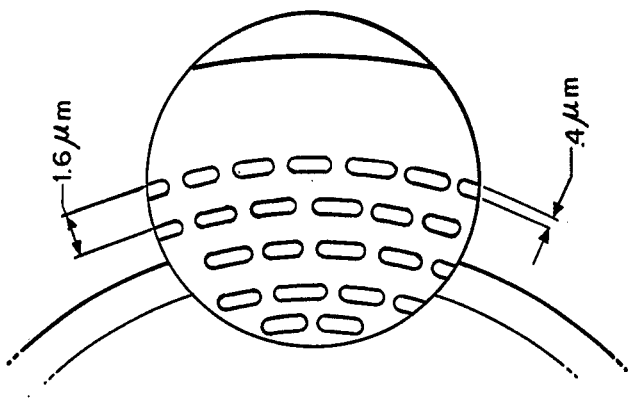
FIG. 5 is a schematic representation of the recordings on a preferred embodiment of a video disc produced by the method of FIG. 4.

As shown in FIG. 5, the resulting replica video disc produced by the method of FIG. 4 is formed with the discrete areas representing the recordings on the master negative, the discrete areas being disposed in a pattern along a continuous spiral reading axis, or path, in the disc. In a particular embodiment, the discrete areas have a width of 0.4 microns, and each track in the spiral is displaced from the adjacent track by a distance of 1.6 microns. The discrete areas on the disc 10, in accordance with the present invention, are such that when the reading beam of a playback machine scans the spiral track on the disc, the beam is directed along a different path by each of the discrete areas, as compared with the path along which it is directed by each of the areas between the discrete areas. In this manner, the reading beam is modulated, so that the information recorded on the disc may be recovered. Because the entire surface of the replica disc of FIG. 5 is coated with a reflective coating, there are no light absorbing regions on the disc to absorb energy from the reading beam. In this way localized heating and concomitant distortion of the disc are minimized.

In the process described in conjunction with FIG. 4, the disc is immersed in a solution of silicon crystals which are grown on the exposed portions of the disc. The present invention is directed in part to other techniques using photographic negative masters. For example, the reflective metallic coating may be applied to the replica disc prior to its being coated with the photoresist, and after photographic exposure, through the photographic master negative, the replica may be sprayed or soaked in an acid solution which etches away the metal coating. The reading beam in the playback machine is reflected only by the metallic coating between the areas, so that the desired modulation of the beam may be achieved. Likewise, instead of removing the exposed metal coating by an acid solution, a chemical may be used which reacts with the exposed metal coating to create a light absorbing surface which, likewise, may be used to achieve the desired modulation of the reading beam in the play back machine. However, a transparent replica disc with light transmissive and light reflective areas is preferred, because of the tendency for the light beam to generate heat at the light absorbing areas. Such heat can have an adverse effect on the replica causing it to "wilt" and become distorted. This can particularly be a problem with plastic replica discs.

Figure 6:
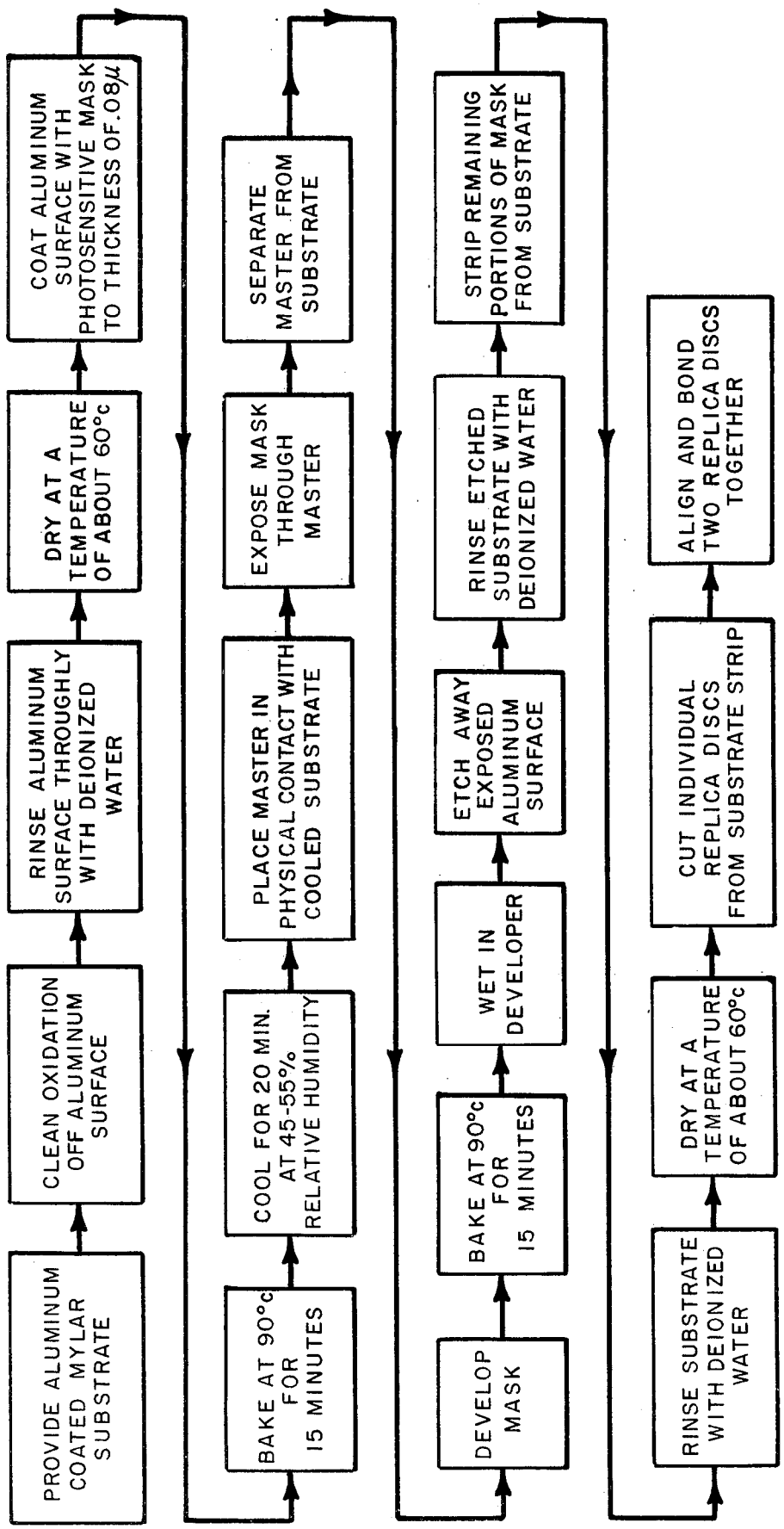
FIG. 6 is a block diagram of the various steps of a first preferred embodiment of the method of this invention for producing finished replica video discs.

Turning now to FIG. 6, a first preferred embodiment of the method of this invention for making a replica disc having a two-dimensional geometry similar to that of FIG. 5 is adapted for use with a film substrate, such as four mil thick Mylar, for example. This Mylar film should be coated on one side with a reflecting layer, such as a layer of aluminum having a reflectivity of about 95%, for example. Such pre-coated Mylar is readily available commercially, and can be obtained in rolls.

Once the aluminum coated Mylar substrate has been provided, the next step in the method of FIG. 6 is to clean off any oxidation that may have accumulated on the aluminum reflecting layer. This is done by passing the coated substrate through a phosphoric acid bath. The acidity of the bath and the residence time of he substrate in the bath should be chosen to provide adequate cleaning without damaging the integrity of either the substrate or the reflective layer.

Following the cleaning step, the coated substrate is thoroughly rinsed with de-ionized water, using jets of water if necessary to remove the phosphoric acid. Preferably, the de-ionized water should have a resistance of 18 mega-ohms. The rinsed substrate is then oven dried at an air temperature of about 80° C. Infra-red radiation can also be used further to speed the drying of the substrate.

Following the first drying step, a thin masking layer is applied over the reflecting layer. This masking layer should preferably be less than about 0.1 microns and most preferably about 0.08 microns in thickness, in order (1) to avoid problems encountered when the thickness of the masking layer is one-fourth the wavelength of the exposing radiation to be used as explained below, and (2) to achieve the benefits of accurate replication associated with a thin masking layer. The masking layer applied in this embodiment is considerably thinner than that used in conventional applications, and is in fact not optically opaque. However, such thin masking layers have been found to provide adequate masking against acid solutions. Such thin masking layers are preferably obtained by diluting a photoresist (such as Shipley 1350 photoresist, for example) to a very low concentration, such as a solids content of about 1.25%, and then applying a thin coat of the diluted photoresist. In this embodiment, the masking layer is applied using roller coating techniques in which a modified roller is preferably used to spread a thin film of the photoresist solution on the reflecting layer. This modified roller is formed of a metal, rather than a rubber as is conventional, and the cylindrical outer surface of the roller is provided with a spiral array of shallow, V-shaped grooves about one mil deep and five mils across, spaced at about 200 grooves per inch. Preferably, this metal roller is used in conjunction with a rubber doctor bar.

After the masking layer has been applied, it is baked in an oven at about 90° C. for about 15 minutes and then cooled for about 20 minutes at a relative humidity of about 45-55%. It has been found that, for the photoresist used in this embodiment, it is important to cool the baked masking layer at a high relative humidity if the photosensitivity of the masking layer is to be preserved.

The next step in the method of this embodiment is to expose the masking layer by physically placing a master (previously prepared as described above) in contact with the cooled masking layer, with the perforated metal layer of the master adjacent the masking layer, and then directing ultra-violet light through the master, onto the masking layer. This exposure may preferably be made using a roller exposer such as the exposer marketed by Gyrex Conex. Preferably, the Gyrex roller exposer is used with a relatively low pressure (about 3.5 psi) in the exposer roller. It is important that the masking layer conform closely to the master during the exposure to obtain an accurate replication on the masking layer of the pattern of microscopic apertures in the metal layer of the master. The flexibility of the Mylar substrate promotes a close conformation between the masking layer and the substrate; however, if necessary, differential air pressure techniques may be used in conjunction with the roller exposer to improve the conformation of the masking layer against the master.

The next step in the method of FIG. 6 is to separate the master from the exposed masking layer and then to develop the exposed masking layer so as selectively to remove those portions of the masking layer which have been exposed through the apertures in the metal layer of the master, in order to expose the corresponding portions of the underlying reflecting layer. In this embodiment the developing step is accomplished by rinsing the exposed masking layer for about 9 seconds in a developing solution of Shipley AZ351 developer diluted 9:1 with distilled water. The thinness of the masking layer results in an excellent correspondence between the size and shape of the exposed portions of the reflecting layer and the apertures of the metal layer of the master. The developed masking layer is baked at a temperature of about 90° C. for about 15 minutes, and is then wet with a suitable wetting agent (such as the developing solution for example) for about ¾ second.

The next step is to etch the substrate for about 30 seconds at a temperature of about 30° C. in a suitable aluminum etching solution such as phosphoric acid. The etching step must be carefully controlled so as to remove exposed portions of the reflecting layer without damaging remaining portions of the masking layer. Because of the extreme thinness of the masking layer, it is subject to damage due to overly extended etching. However, the thinness of the masking layer promotes accurate replication, as explained above. The reflecting layer should be made no thicker than necessary to obtain the desired reflectivity in order to minimize the required etching time. The etching solution perforates the reflecting layer of the substrate with a microscopic pattern of apertures which are accurate copies of the apertures in the metal layer of the master.

The next step is to rinse the etching solution from the substrate by agitating the substrate in de-ionized water, and then to place the substrate in a stripping solution to remove all remaining portions of the masking layer. A standard stripping solution such as that marketed by Shipley is suitable, and generally no longer than ten minutes is required to strip off the masking layer. The stripped substrate is then placed in a cascade bath of de-ionized water to remove the stripping solution, and is then dried in an oven at about 60° C.

Up to this point, the substrate has been processed as an elongated strip of roll stock, which has one entire surface coated first with the reflecting layer, then with the masking layer, and a plurality of separate replicas have been formed in series on the reflecting layer. By keeping the substrate intact throughout the fabrication of the replicas, the process of FIG. 6 is simplified. The substrate can be handled as a strip rather than as a multiplicity of discs, and conveyor techniques can be used to automate and reduce the handling required. For example, roller coaters used to apply the masking layer and roller exposers of the type described above are well suited for processing a moving strip of substrate, and the substrate can be passed through conveyor ovens and baths.

Once the complete replica has been formed on the reflecting layer of the substrate, individual replica discs are cut from the substrate. In order to prepare a two-sided recording medium, two separate replica discs are aligned and bonded together with the reflecting layers on the inside.

Figure 7:
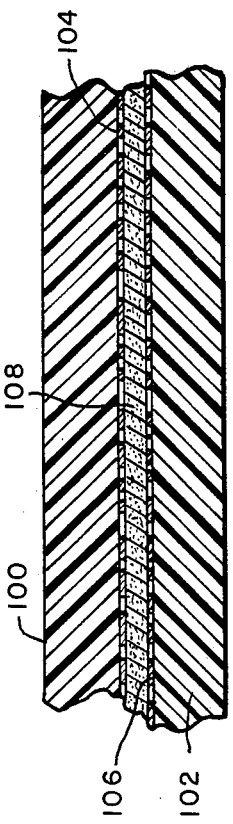
FIG. 7 is a cross-sectional view of a two-sided recording medium fabricated according to the method of FIG. 6.

FIG. 7 shows a cross-sectional view of such a two-sided recording medium which includes a first substrate 100 and a second substrate 102. Each of the substrates 100,102 of this embodiment is formed of a sheet of 4 mil transparent Mylar, and each is provided with a respective reflecting layer 104, 106. Each of the reflecting layers 104,106 is perforated with a plurality of apertures, each of which has a minimum dimension of less than about 0.6 microns, preferably about 0.4 microns. A layer of adhesive 108 having a thickness of about 1 mil is interposed between the two reflecting layers 104,106 such that it is the two Mylar substrates 100,102 which form the exterior of the recording medium. Thus, the need for a separate protective layer to protect the reflecting layers 104,106 is avoided. Preferably, the adhesive 108 is transparent or translucent to minimize localized heating of the replica disc during reading and, in addition, is heat resistant. Because the reflective layer 104,106 which preferably covers over 70% of the recording surface of the respective substrate 100,102 efficiently reflects incident radiation and the apertures efficiently transmit incident radiation into the transparent adhesive layer, localized absorption of the reading beam of radiation is substantially avoided. In this manner, localized heating is avoided, and a recording medium is provided which can be read in a stop-frame mode substantially without thermal damage to the medium. In alternate embodiments of the invention, it may be preferable to provide a substrate with a reflecting layer on both sides, to form two different replica discs in alignment on opposed sides of the substrate during a single processing of the substrate, and then to apply a conventional scuff coat to protect the replica discs.

FIG. 8 is a flow diagram of a second preferred embodiment of the method of this invention for forming replica discs. The method of FIG. 8 is in many respects similar to that of FIG. 6, except that the method of FIG. 8 is adapted for use with disc-shaped substrates rather than with roll stock substrate. In addition, the method of FIG. 8 utilizes a chrome rather than an aluminum reflecting layer. The following discussion takes up only the important differences between the methods of FIGS. 6 and 8.

Three important differences between the methods of FIGS. 6 and 8 relate to the application of the masking layer, the etching, and the protection of the finished replica, respectively. In the method of FIG. 8, coating techniques are used to apply the masking layer to the substrate. In the presently preferred embodiment, the substrate, which is the size of a standard video disc, is rotated in a horizontal plane at a rotational velocity of about 2000 RPM. Then, about 20 ml of photoresist (of the type and solids content described above in connection with FIG. 6) is placed on the reflecting layer of the substrate in a ring about two to three inches in radius, centered on the axis of rotation. The substrate is rotated for at least 7-10 seconds until all interference colors disappear from the film of photoresist. It has been found that relatively slow rotational speeds, such as 2000 RPM as described above, are preferable to higher, conventional speeds in forming a thin, uniform masking layer of the type desired here.

The second important difference relates to the nature of the etching solution, which in the method of FIG. 8 is appropriate for etching apertures in chrome rather than aluminum reflecting layers. The etching solution is preferably a standard, commercially available chrome etchant, such as that marketed by Shipley. Preferably, the chrome etching step is carried out at a temperature of about 30° C. with an etching time of about eight seconds.

The third important difference relates to the manner in which the perforated reflecting layer of the replica disc is protected from abrasion. In the method of FIG. 8 a conventional, clear vinyl scuff coat is applied to the finished replica disc. Such scuff coats are known to the prior art and therefore will not be described in detail here.

It should be understood that not all embodiments of the invention require the two baking steps after the masking layer coating step and the developing step. It has been found that excellent results may be obtained by (1) substituting an air drying step for the first baking step and (2) eliminating the second baking step entirely and passing the substrate with the developed masking layer directly to the etching solution. The air drying step should be conducted at room temperature and at a relative humidity of about 45-65% relative humidity, for a period of about 45 minutes. By eliminating both baking steps the capital cost of baking ovens as well as the need for a wetting step before the etching step can be avoided.

The methods of FIGS. 6 and 8 provide a number of important advantages. They can be used to produce large numbers of replica discs, substantially without wear or abrasion to the master. Since photo-optical replication techniques are used, wear associated with conventional molding or pressing replicatoin techniques is entirely avoided. In addition, these methods can be used to fabricate replica discs in which over 70% of the recording area is reflecting and the data are stored as transmissive holes or apertures. Such discs minimize localized heating and are therefore relatively less subject to damage due to localized heating than replica discs which rely on optical absorption effects. Furthermore, the method of FIG. 6 is particularly advantageous in that roll stock, aluminum coated Mylar is commercially availble at low cost and conveyor processing techniques are well suited for low cost, automated processing.

The replica disc of this invention is well adapted for reliable fabrication in that the apertures (which correspond to the removed portions of the masking layer) are in effect pinholes. Thus, no long, thin features are formed in the reflecting layer, and diffraction effects do not therefore present a significant problem. Furthermore, potential problems such as overdeveloping of the masking layer, detaching of the masking layer, and under-etching of the reflecting layer are minimized with the pinhole geometry of the preferred embodiments described above.

Of course, it should be understood that various changes and modifications to the preferred embodiments described above will be apparent to those skilled in the art. For example, other types of flexible film may be substituted for Mylar in the embodiment of FIG. 6, and film either thicker or thinner than the 4 mil example discussed above can be used. In addition, the methods and structures of this invention are not limited to use with video discs, but are instead suitable for other high density storage media such as optically read audio discs and the like. The foregoing description is intended to illustrate the invention rather than to limit it, and it is the following claims, including all equivalents, which define the scope of the invention.

I claim:

1. A method for fabricating a high density recording medium comprising the following steps:
    (a) providing a substrate having a first surface covered by a reflecting layer;
    (b) coating at least a portion of the reflecting layer with a masking layer of a radiation sensitive material, said masking layer having a thickness less than about 0.1 microns;
    (c) exposing a microscopic pattern on the masking layer by a contact printing step such that a first patterned plurality of microscopic regions of the masking layer, each having a minimum dimension of less than about 0.6 microns, is exposed to a radiation to a different extent than is a second region of the masking layer;
    (d) then selectively removing the first plurality of microscopic regions of the masking layer to expose a plurality of corresponding regions of the underlying reflecting layer, each corresponding region having a minimum dimension of less than about 0.6 microns;
    (e) selectively removing the plurality of corresponding regions of the reflecting layer by an etching step to expose a plurality of corresponding regions of the underlying substrate, the second region of the masking layer acting to mask and protect the corresponding region of the underlying reflecting layer during the etching step; and then
    (f) removing the second region of the masking layer.

2. The method of claim 1 wherein the substrate is translucent.

3. The method of claim 1 wherein the etching step of the removing step (e) comprises the step of bringing the plurality of corresponding regions of the reflecting layer into contact with an etching solution.

4. The method of claim 1 wherein the masking layer comprises a photoresist.

5. The method of claim 1 wherein the coating step (b) comprises the following steps:
    applying a mixture of a photoresist and a carrier to the reflecting layer, said mixture having a solids content of less than about 5%;
    baking the applied mixture to drive off a major portion of the carrier; and then
    cooling the baked mixture at a relative humidity in excess of about 40%.

6. The method of claim 5 wherein the cooling step is conducted at a relative humidity in the preferred range of about 45-55%.

7. The method of claim 6 wherein the solids content of the applied mixture is about 1-½%.

8. The method of claim 1 wherein the recording medium is a replica video disc.

9. The method of claim 1 wherein the recording medium is a replica audio disc.

10. A method for fabricating a high density recording medium comprising the following sequential steps:
    (a) providing a translucent substrate having a first surface covered by a reflecting layer;

(b) applying a mixture of a photosensitive material and a carrier to the reflecting layer, said mixture having a solids content of less than about 5%;

(c) baking the applied mixture to drive off a major portion of the carrier, the remaining photosensitive material having a thickness less than about 0.1 microns;

(d) cooling the baked mixture;

(e) exposing a microscopic pattern on the cooled photosensitive material by a contact printing step such that a first patterned plurality of microscopic regions of the photosensitive material, each having a minimum dimension of less than about 0.6 microns, is exposed to a radiation to a different extent than is a second region of the photosensitive material;

(f) then selectively removing the first plurality of microscopic regions of the photosensitive material to expose a plurality of corresponding regions of the underlying reflecting layer, each corresponding region having a minimum dimension of less than about 0.6 microns;

(g) selectively removing by etching the plurality of corresponding regions of the reflecting layer to expose a plurality of corresponding regions of the underlying substrate, the second region of the photosensitive material acting to mask and protect the corresponding region of the underlying reflecting layer during the removing by etching step; and then (h) removing the remaining portion of the photosensitive material.

11. The method of claim 10 wherein the cooling step is conducted at a relative humidity in the preferred range of about 45-55%.

12. The method of claim 10 wherein the solids content of the applied mixture is about 1-½%.

13. The method of claim 10 wherein the photosensitive material comprises a photoresist.

14. The method of claim 10 wherein the recording medium is a replica video disc.

15. The method of claim 10 wherein the recording medium is a replica audio disc.

* * * * *

UNITED STATES PATENT AND TRADEMARK OFFICE
CERTIFICATE OF CORRECTION

PATENT NO. : 4,423,137
DATED : December 27, 1983
INVENTOR(S) : Marshall D. Rester It is certified that error appears in the above-identified patent and that said Letters Patent is hereby corrected as shown below:

Column 12, Line 66, Claim 10, please delete "sequential".

Signed and Sealed this

Twentieth Day of August 1985

[SEAL]

Attest:

DONALD J. QUIGG

*Attesting Officer*  *Acting Commissioner of Patents and Trademarks*